(12) United States Patent
Huang

(10) Patent No.: US 7,624,752 B2
(45) Date of Patent: *Dec. 1, 2009

(54) INFLATION VALVE

(76) Inventor: Tien-Tsai Huang, No.4-2, Lane 30, Wu Chyuan St., Pan-Chiao, Taipei (TW)

( * ) Notice: Subject to any disclaimer, the term of this patent is extended or adjusted under 35 U.S.C. 154(b) by 433 days.

This patent is subject to a terminal disclaimer.

(21) Appl. No.: 11/562,969

(22) Filed: Nov. 22, 2006

(65) Prior Publication Data

US 2008/0115838 A1      May 22, 2008

(51) Int. Cl.
  *F16K 15/20* (2006.01)
(52) U.S. Cl. ............... 137/226; 137/228; 137/493.6
(58) Field of Classification Search ................. 137/226, 137/228, 493.1–493.6
  See application file for complete search history.

(56) References Cited

U.S. PATENT DOCUMENTS

| | | | | |
|---|---|---|---|---|
| 1,053,623 A * | 2/1913 | McMillion | ................ | 137/226 |
| 1,137,209 A * | 4/1915 | Henemier | ................ | 137/226 |
| 1,156,328 A * | 10/1915 | Thayer | ................ | 137/226 |
| 1,166,221 A * | 12/1915 | Kahn | ................ | 137/226 |
| 1,369,343 A * | 2/1921 | Lamb | ................ | 137/226 |
| 1,434,708 A * | 11/1922 | Kelsey | ................ | 137/226 |
| 1,738,621 A * | 12/1929 | Washington | ................ | 137/226 |
| 1,741,198 A * | 12/1929 | McKenna | ................ | 137/226 |
| 1,772,107 A * | 8/1930 | Nelson | ................ | 137/226 |
| 2,218,008 A * | 10/1940 | Rhodes | ................ | 152/429 |
| 2,306,495 A * | 12/1942 | Payne | ................ | 137/226 |
| 2,672,153 A * | 3/1954 | Kipp | ................ | 137/226 |
| 2,690,757 A * | 10/1954 | Orchowski | ................ | 137/226 |
| 3,200,843 A * | 8/1965 | Jackson | ................ | 137/493.2 |
| 3,426,787 A * | 2/1969 | Fuller | ................ | 137/226 |
| 3,450,147 A * | 6/1969 | Webb | ................ | 137/226 |
| 3,454,033 A * | 7/1969 | Smith | ................ | 137/226 |
| 4,072,048 A * | 2/1978 | Arvan | ................ | 137/228 |
| 7,073,527 B1 * | 7/2006 | Freire Teiga | ................ | 137/226 |
| 7,404,412 B2 * | 7/2008 | Milanovich et al. | ................ | 137/226 |
| 2008/0047613 A1 * | 2/2008 | Huang | ................ | 137/226 |

* cited by examiner

*Primary Examiner*—Stephen Hepperle
*Assistant Examiner*—Craig Price
(74) *Attorney, Agent, or Firm*—Pai Patent & Trademark Law Firm; Chao-Chang David Pai

(57) ABSTRACT

An inflation valve includes a hollow sleeve having a first chamber and a second chamber; a first valve body located in the first chamber; a second valve body located in the second chamber; an air inlet connector screwed to an upper end of the second chamber; and a central pin assembly mounted in the air inlet connector. When an object being inflated by the inflation valve is excessively inflated, the inflation valve automatically releases surplus high-pressure air via at least one release pod of the second chamber by pushing the first valve body and the second valve body upward.

17 Claims, 8 Drawing Sheets

INFLATION VALVE

FIELD OF THE INVENTION

The present invention relates to an inflation valve, and more particularly to an inflation valve that automatically releases surplus high-pressure air when an object is excessively inflated via the inflation valve.

BACKGROUND OF THE INVENTION

As shown in FIG. 1, a currently available conventional inflation valve 10 provided on a tire or an inflatable mattress has an internal pin valve body 12, and an external locating member 14 provided around a lower end of the inflation valve 10 for firmly connecting the inflation valve 10 to an opening 720. The opening 720 may be formed on a wheel rim 700 of a tire, for example. A user may connect a pumping device (not shown) to an upper end of the inflation valve 10, so that the pin valve body 12 is triggered by the pumping device to release an airtight state in the inflation valve 10, allowing the pumping device to pump air into the tire via the inflation valve 10.

The pin valve body 12 on the conventional inflation valve 10 only allows air to flow in one way. When a user wants to pump a tire, for example, to a fixed pressure level, a pressure gauge is usually connected to the pumping device before pumping, so that the internal pressure of the tire may be detected in real time to avoid, an excessively or insufficiently pumped tire that causes dangers in driving.

In the detection of tire pressure with a pressure gauge externally connected to the pumping device, the detected pressure is affected not only by the accuracy of the pressure gauge, but also by the operating skill of the gauge user. That is, it is uneasy to always maintain the accuracy of the detected pressure at a preset level. An unbalanced, an exceeded, or an insufficient tire pressure would very possibly seriously endanger a driver's safety and even life in the course of driving.

SUMMARY OF THE INVENTION

A primary object of the present invention is to provide an inflation valve that automatically releases surplus high-pressure air when an object is excessively inflated via the inflation valve; so as to eliminate the drawbacks existed in the conventional inflation valves.

To achieve the above and other objects, the inflation valve according to the present invention includes a hollow sleeve, an air inlet connector, a first valve body, a second valve body, and a central pin assembly.

The hollow sleeve is in the form of a hollow tubular member being provided at a bottom with a central opening. An inner space of the hollow sleeve above the central opening is divided into a first chamber and a second chamber located above and communicable with the first chamber. The hollow sleeve is also formed, on an inner wall surface at a joint of the first and the second chamber, with a beveled stop shoulder.

The first valve body is located in the first chamber and in the form of a long stem having a conical head. The first valve body is provided at a lower end with a radially outward flange, below which a first compression spring is provided, to elastically axially displace the first valve body in the first chamber.

The second valve body is located in the second chamber and defines a through hole extended along an axis thereof, such that the head of the first valve body is fitly received in the through hole. A second compression spring is provided above the second valve body to apply an elastic force against the second valve body, so that the second valve body is able to elastically axially displace in the second, chamber. The second valve body is formed, around an outer wall surface closely below an upper end thereof, with a downward and inward inclined section corresponding to a first annular groove formed on an inner wall surface of the second chamber. A first airtight gasket, is mounted in the first annular groove, such that when the second valve body is moved downward by the elastic force of the second compression spring, the inclined section may be pressed against the first airtight gasket. At least one release port is formed on a wall of the second chamber between the inclined section and the beveled stop shoulder to communicate the inner space of the hollow sleeve with an external space. The second valve body is further formed, around the outer wall surface closely above a lower end thereof, with a second annular groove for receiving a second airtight gasket therein, such that the second airtight gasket is located corresponding to the beveled stop shoulder.

The air inlet connector is axially mounted to an upper end of the second chamber of the hollow sleeve, and defines along an axis thereof an air inlet having a second internally threaded section provided around an inner peripheral wall thereof; and the air inlet connector is provided around an outer wall surface with a first externally threaded section.

The central pin assembly is mounted in the air inlet with a lower end screwed, to the head of the first, valve body, so as to push the first valve body downward. When an excessive amount of high-pressure air has been pumped, the surplus high-pressure air may overcome the elastic force of the second compression spring to push the first and the second valve body upward, and be released from the hollow sleeve via the release port.

The second chamber has an inner diameter larger than that of the first chamber.

The first valve body is further formed below the flange with a downward projected ring, and an airtight washer is mounted around the first valve body above the flange.

The air inlet connector is provided around a lower outer wall surface with a second externally threaded section, against a bottom surface upon which an upper end of the second compression spring is pressed. And, the second chamber is provided on the inner wall surface with a first internally threaded section to mesh with the second externally threaded section of the air inlet connector, so that the air inlet connector may be screwed to an upper end of the second chamber.

The air inlet connector is formed, above the second externally threaded section with a third annular groove for receiving a third airtight gasket therein.

An upper opening of the second valve body above the through hole is flared to form an expanded opening, which allows air to easily flow into the second valve body through the through hole to a space below the second valve body.

The central pin assembly includes a pin holder and a central pin. The pin holder is provided around, an outer wall surface with a third externally threaded section, so that the pin holder may be mounted in the air inlet via meshing of the third externally threaded section with the second internally threaded section in the air inlet. The pin holder is formed on an upper surface with a centered through hole, around which a plurality of air vents are provided. And, the central pin is in the form of an elongated stem and sequentially downward extended through the centered through hole of the pin holder and the through hole of the second valve body to fixedly connect to the head of the first valve body.

The central pin has a diametrically expanded head portion, and an externally threaded lower end for screwing to an internally threaded central hole formed on the head of the first valve body.

The inflation valve of the present invention further includes a cap removably covering the air inlet connector. The cap is provided on a top surface with a pressure value mark to indicate an applicable pressure range of the inflation valve.

The hollow sleeve is internally provided near a bottom thereof with a partition, and the central opening is formed at a center of the partition.

The hollow sleeve is provided, on an outer wall surface at a predetermined position, with an annular seat, and around a lower outer wall surface, with a fourth externally threaded section. The annular seat is provided at an underside with a fourth annular groove.

In another embodiment of the present invention, the hollow sleeve has a closed bottom, and the central opening is formed at a center of the closed bottom, and the hollow sleeve is provided around a lower outer wall surface with a plurality of spaced locating rings. A locating member is put around the locating rings, and is provided, on an outer surface at a predetermined position, with a fifth annular groove, and at a bottom corresponding to the central opening at the bottom of the hollow sleeve, with an air vent.

In a further embodiment of the present invention, the hollow sleeve is an L-shaped tubular member to include a vertical section and a horizontal section. The first chamber and the second chamber are formed in the vertical section; and the first valve body, the second valve body, the air inlet connector, and the central pin assembly are all located in the vertical section. An air passage is extended from a bottom of the first chamber along an axis of the hollow sleeve to a terminal end of the horizontal section to form the central opening. And, the horizontal section of the hollow sleeve is provided, on an outer wall surface around the terminal end, with a radially outward flange and a fifth externally threaded section.

In a still further embodiment of the present invention, the hollow sleeve is provided, around an inner wall surface below the partition, with a sixth annular groove for receiving a sixth airtight gasket therein, and below the sixth annular groove with a third internally threaded section.

The hollow sleeve is provided, on an outer wall surface with an annular recess corresponding to an outer opening of the release port on the hollow sleeve. And, a dust ring is mounted in the annular recess.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention is now described with some preferred embodiments thereof. In the illustrated embodiments, the present invention is used as an inflation valve to control an air or gas flow. However, it is understood the present invention may also be applied to a filling valve for controlling general liquid flow.

Figure 1:
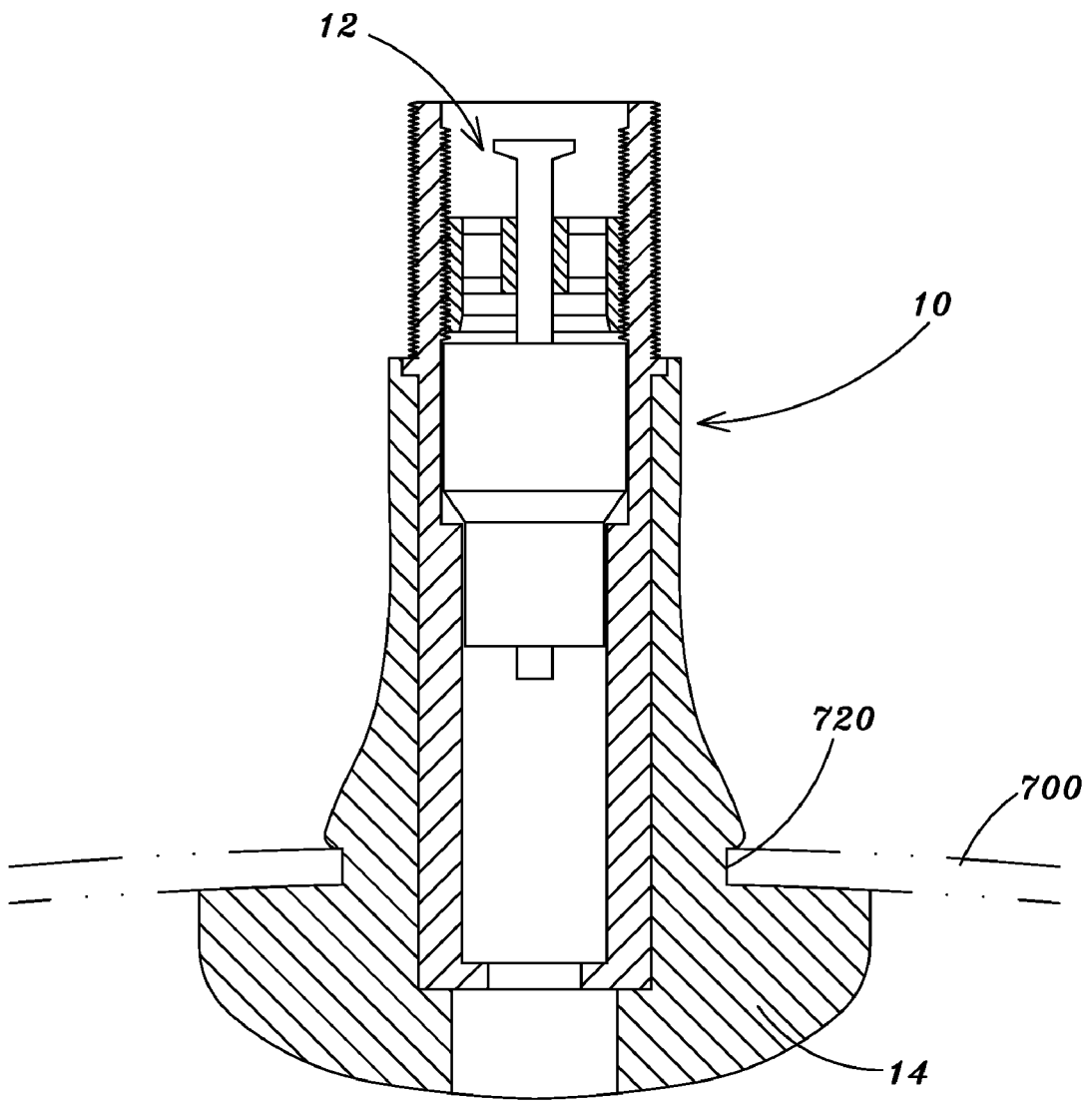
FIG. 1 is a vertical sectional view of a conventional inflation valve.
Figure 2:
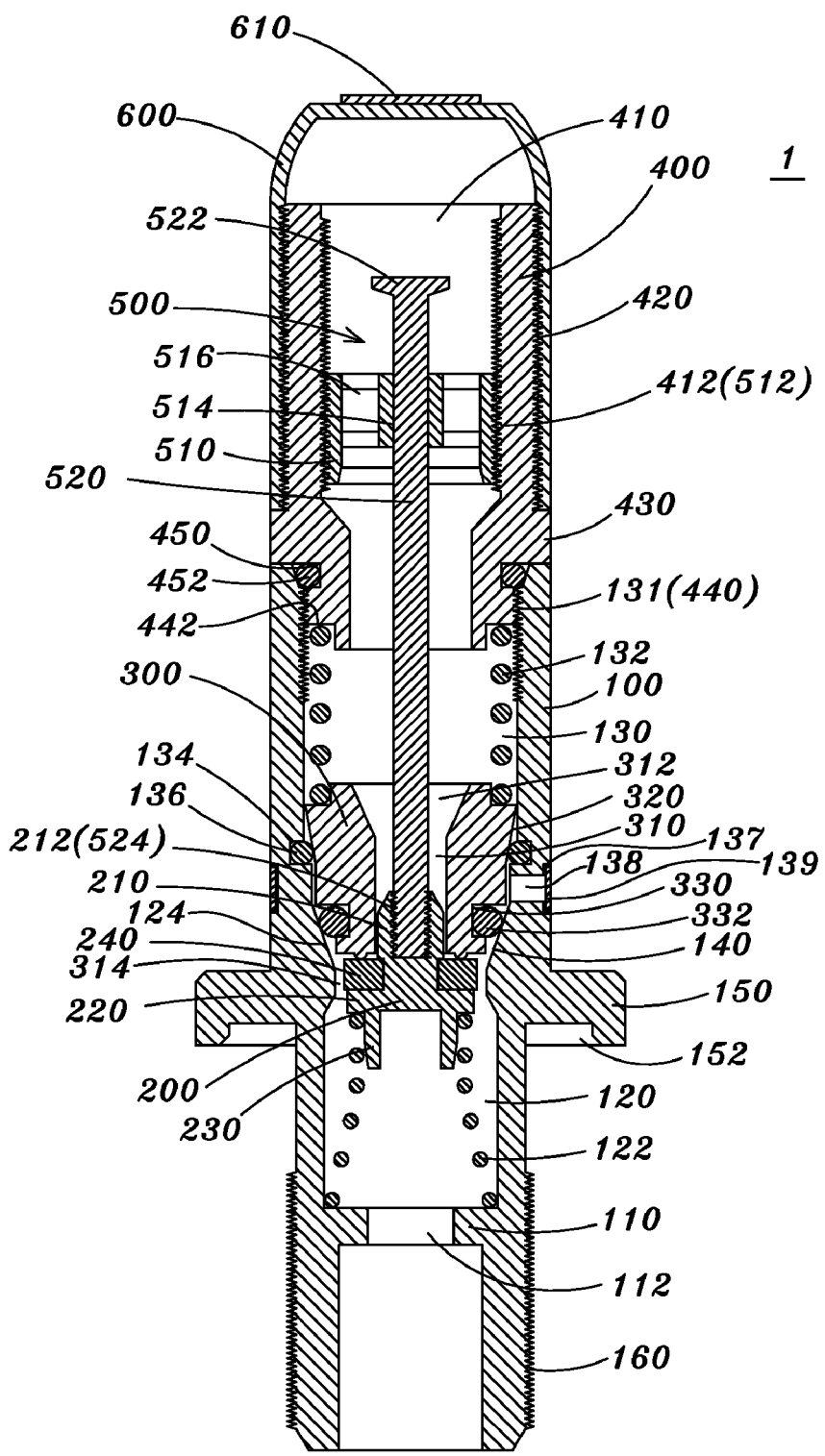
FIG. 2 is a vertical sectional view of an inflation valve according to a first preferred embodiment of the present invention.

Referring to FIG. 2, the inflation valve 1 in the first preferred embodiment includes a hollow sleeve 100, an air inlet connector 400, a first valve body 200, a second valve body 300, and a central pin assembly 500.

The hollow sleeve 100 is a long and straight hollow tubular member being internally provided near a bottom thereof with a partition 110 having a central opening 112. An inner space of the hollow sleeve 100 above the central opening 112 is divided into a first chamber 120 and a second chamber 130. The second chamber 130 is located above and communicable with the first chamber 120, and has an inner diameter larger than that of the first chamber 120. The hollow sleeve 100 is provided, on an inner wall surface at a joint 124 of the first chamber 120 and the second chamber 130, with a beveled stop shoulder 140, and around an outer wall surface at a predetermined position, with a radially outward extended annular seat 150. The annular seat 150 is formed at an underside with a fourth annular groove 152. The hollow sleeve 100 is also formed around a lower outer wall surface with a fourth externally threaded section 160.

The first valve body 200 is located in the first chamber 120, and is in the form of a long stem having a conical head 210. The conical head 210 is provided with an open-topped and internally threaded central hole 212. A radially outward flange 220 is formed at a lower end of the first valve body 200, and a downward projected ring 230 is formed below the flange 220. An airtight washer 240 is put around a portion of the first valve body 200 immediately above the flange 220. A first compression spring 122 is located below the first valve body 200 to apply an elastic force against the first valve body 200 for displacing the latter axially in the first chamber 120.

The second valve body 300 is located in the second chamber 130, and is in the form of a hollow cylinder defining a through hole 310 extended along an axis of the cylinder, such that the head 210 of the first valve body 200 may be received in the through hole 310. An upper opening of the second valve body 300 above the through hole 310 is flared to form an expanded opening 312, which allows air to easily flow into the second valve body 300 through the through hole 310 to a space 314 below the second valve body 300. A second compression spring 132 is located above the second valve body 300 to apply an elastic force against the second valve body 300 for displacing the latter axially in the second chamber 130. The second valve body 300 is formed, around an outer wall surface closely below an upper end thereof, with a downward and inward inclined section 320. The second chamber 130 is formed on, an inner wall surface corresponding to the inclined section 320 of the second valve body 300, with a first annular groove 134, in which a first airtight gasket 136 is mounted, such that when the second valve body 300 is moved downward by the elastic force of the second compression spring 132, the inclined section 320 may be pressed against the first airtight gasket 136 to completely isolate a space below the second valve body 300 from a space above the second valve body 300. At least one release port 138 is formed on the wall of the second chamber 130 between the inclined section 320 and the beveled stop shoulder 140 to communicate the inner space of the hollow sleeve 100 with an external space, so that surplus air in the first chamber 120 is released via the release port 138. The second valve body 300 is also formed around the outer wall surface closely above a lower end thereof, with a second annular groove 330 for receiving a second airtight gasket 332 therein. The second airtight gasket 332 is located corresponding to the beveled stop shoulder 140, such that when the second valve body 300 is moved downward to reach a bottom of the second chamber 130, the second airtight gasket 332 is pressed against the beveled stop shoulder 140 to provide an air sealing effect thereat.

Moreover, the hollow sleeve 100 is provided on an outer wall surface with an annular recess 137 corresponding to an outer opening of the release port 138 on the hollow sleeve 100. A dust ring 139 in the form of a thin elastic ring is mounted in the annular recess 137 to prevent external dust, foreign matters, and rainwater from invading the inflation valve 1 via the release port 138. When the surplus high-pressure air in the tire is released from the release port 138, the dust ring 139 may be deformed by the released air to form, a clearance between the dust, ring 139 and the annular recess 137, allowing the surplus air to release via the clearance without interfering with the normal air releasing function of the release port 138.

The air inlet connector 400 is axially mounted to an upper end of the second chamber 130 of the hollow sleeve 100, and defines along an axis thereof an air inlet 410. The air inlet 410 is provided around an inner peripheral wall surface with a second internally threaded section 412. The air inlet connector 400 is provided around an outer wall surface with a first externally threaded section 420, below the first externally threaded section 420 with a radially outward flange 430, and around a lower outer wall surface below the flange 430 with a second externally threaded section 440, against a bottom surface 442 upon which an upper end of the second compression spring 132 is pressed. The second chamber 130 is also provided on the inner wall surface with a first internally threaded section 131 corresponding to the second externally threaded section 440 of the air inlet connector 400, so that the air inlet connector 400 may be screwed to an upper end of the second chamber 130. By screwing the air inlet connector 400 into the second chamber 130 to a different depth or using a second compression spring 132 of a different elastic coefficient, it is possible to change a magnitude of the elastic force applied by the second compression spring 132 on the second valve body 300 and accordingly adjust a pressure setting for the inflation valve 1. The air inlet connector 400 is formed above the second externally threaded section 440 with a third annular groove 450 for receiving a third airtight gasket 452 therein. When the air inlet connector 400 is screwed to the upper end of the second chamber 130, the third airtight gasket 452 provides an air sealing effect at a joint of the flange 430 and the hollow sleeve 100. A cap 600 is screwed to the first externally threaded section 420 of the air inlet connector 400, so as to protect the air inlet connector 400 against invasion by foreign matters. The cap 600 may be provided on a top surface with a pressure value mark 610 to indicate an applicable pressure range of the inflation valve 1.

The central pin assembly 500 is mounted in the air inlet 410 with a lower end screwed to the head 210 of the first valve body 200, so as to push the first valve body 200 downward. The central pin assembly 500 includes a pin holder 510 and a central pin 520. The pin holder 510 is provided around an outer wall surface with a third externally threaded section 512, so that the pin holder 510 may be mounted in the air inlet 410 via meshing of the third externally threaded section 512 with the second internally threaded section 412 in the air inlet 410. The pin holder 510 is formed on an upper surface with a centered through hole 514, around which a plurality of air vents 516 are provided for passing air therethrough. The central pin 520 is in the form of an elongated stem having a diametrically expanded head portion 522, and an externally threaded lower end 524. The central pin 520 is sequentially downward extended through the centered through hole 514 of the pin holder 510 and the through hole 310 of the second valve body 300 to screw to the internally threaded central hole 212 of the first valve body 200.

Figure 3A:
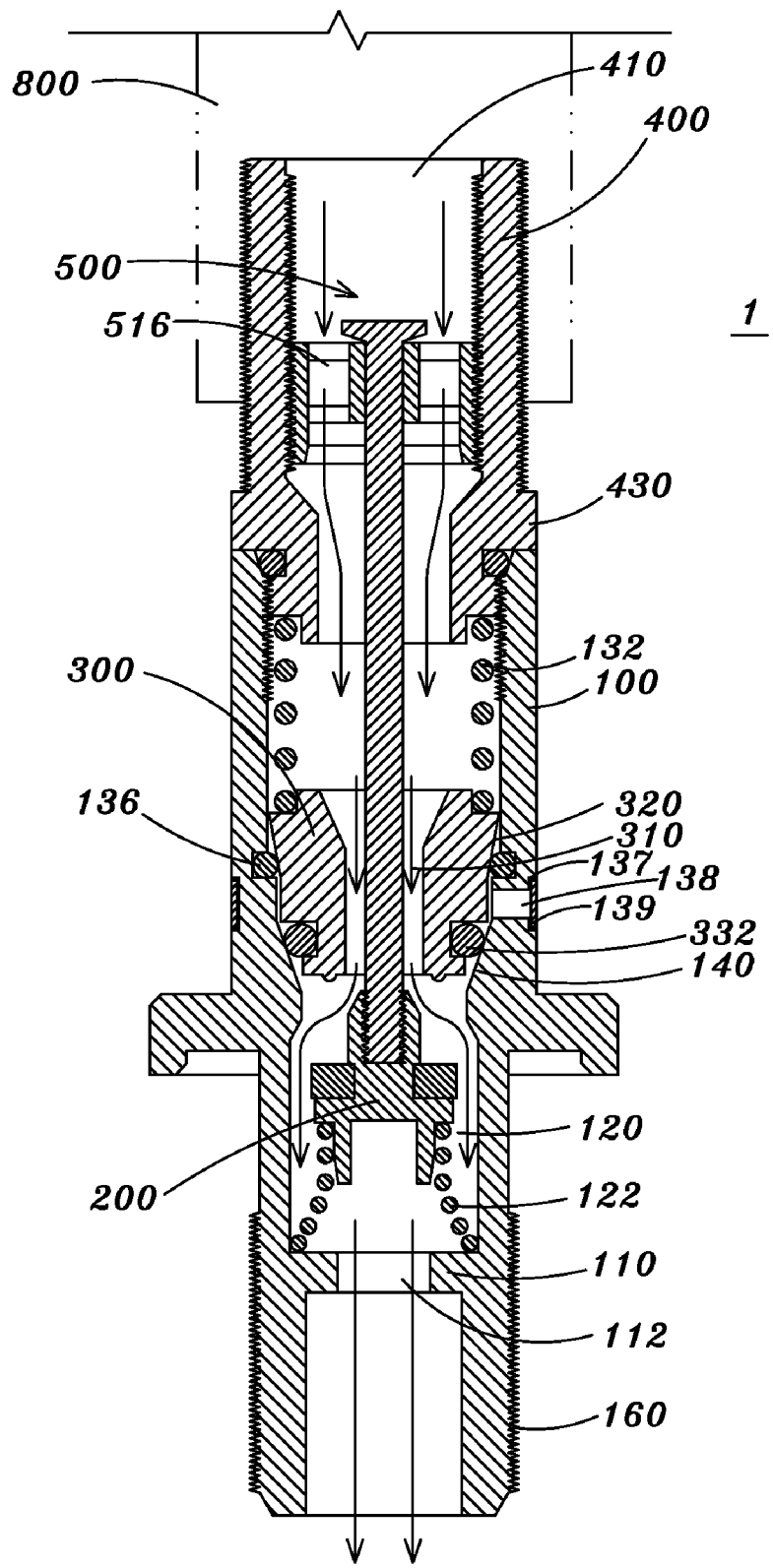
FIGS. 3A and 3B show internal movements of the inflation valve of FIG. 2 in the process of pumping a tire.
Figure 4:
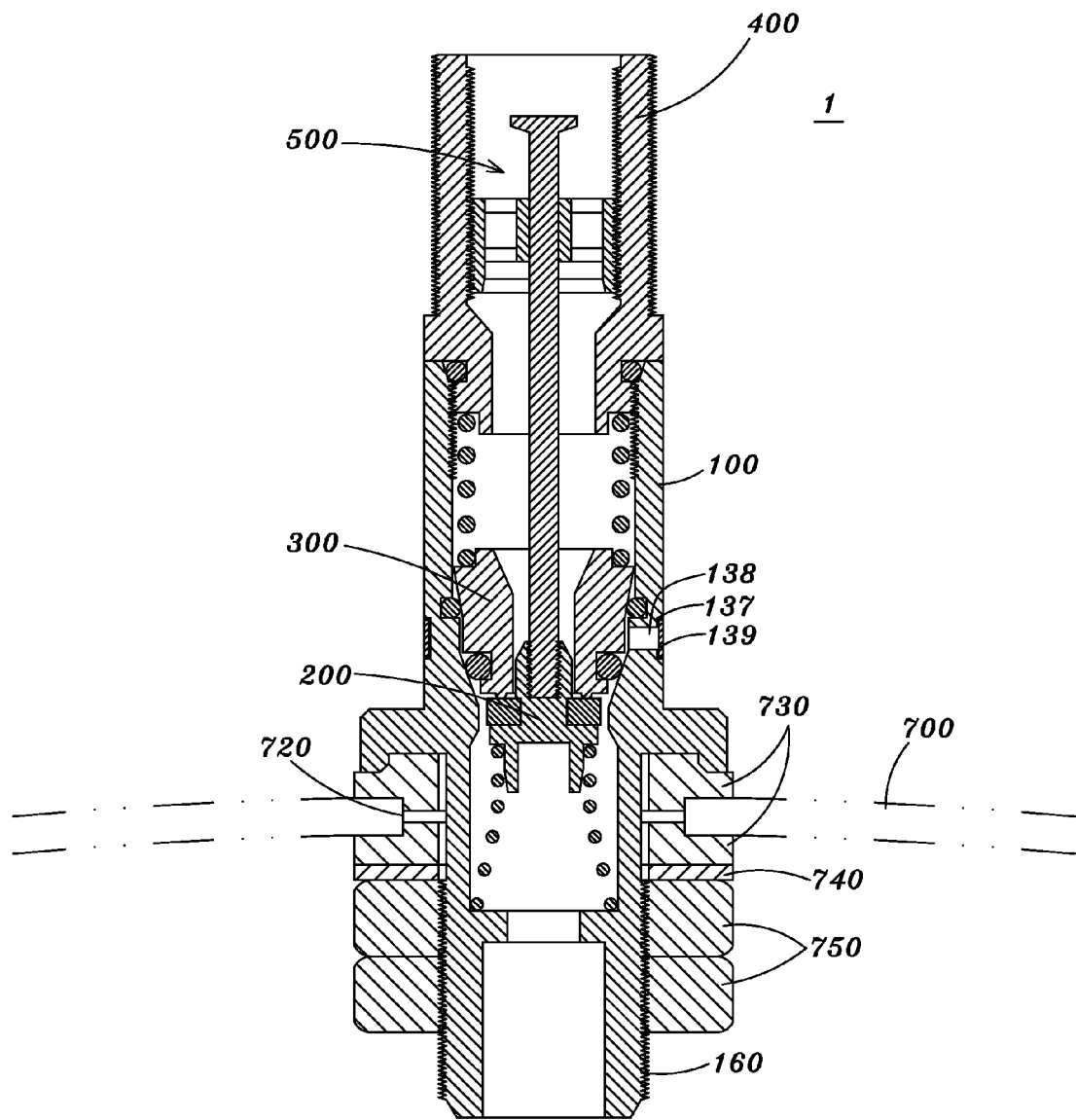
FIG. 4 is a vertical sectional view showing the inflation valve of FIG. 2 mounted on a wheel rim.

Referring to FIG. 4, the inflation valve 1 according to the first preferred embodiment of the present invention is mounted to a wheel rim 700 on a tire. The wheel rim 700 is provided at a predetermined position with an opening 720, so that a lower end of the hollow sleeve 100 of the inflation valve 1 may be extended from an outer side into an inner side of the wheel rim 700 via the opening 720. Two sealing elements 730 are mounted around the hollow sleeve 100 to be separately located at the inner and the outer side of the opening 720. Moreover, a washer 740 and two fastening members 750 are sequentially mounted to and around the lower end of the hollow sleeve 100 in the wheel rim 700, so that the inflation valve 1 is fastened to the opening 720 via the fastening members 750. A user may use a pumping device 800 (see FIG. 3A) to pump the tire via the inflation valve 1.

As can be seen from FIG. 3A, when it is desired to use the pumping device 800 to pump a tire (not shown) via the inflation valve 1, first connect the pumping device 800 to the air inlet connector 400. At this point, the central pin 520 of the central pin assembly 500 is pushed downward by the pumping device 800, bringing the first, valve body 200 to overcome the upward elastic force of the first compression spring 122 and move downward in the first chamber 120, so that high-pressure air is allowed to sequentially pass through the air inlet 410 of the air inlet connector 400, the air vents 516 of the pin holder 510, and the through, hole 310 of the second valve body 300 into the first chamber 120, and then flows through the central opening 112 of the partition 110 into the tire to inflate the same.

Figure 3B:
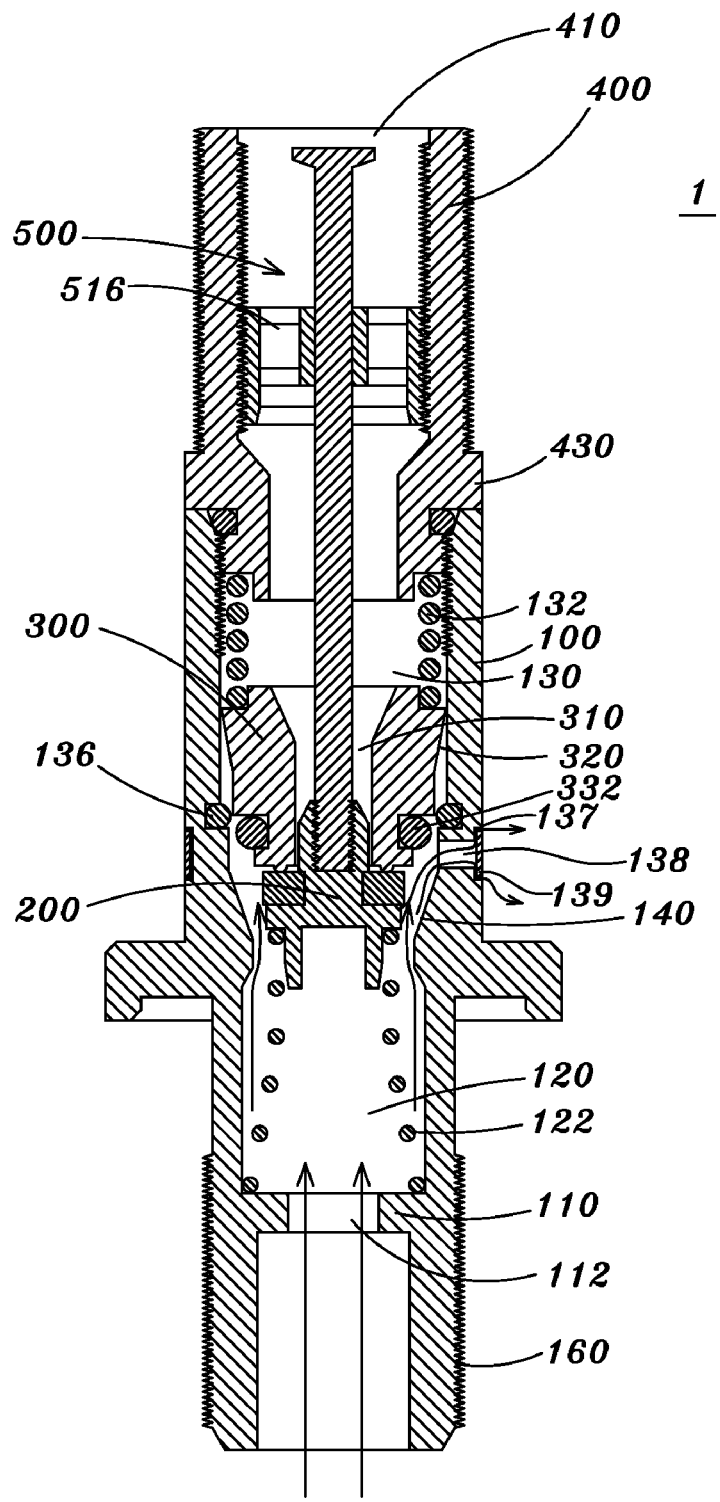

As having been mentioned above, a pressure setting may be adjusted by screwing the air inlet connector 400 into the upper end of the second chamber 130 for a different depth, or using a second compression spring 132 of a different elastic coefficient. Referring to FIG. 3B, when the tire is pumped and the pumping device 800 is removed from the air inlet connector 400, and the inflated tire has a tire pressure exceeding the pressure setting therefor, and when the tire internal pressure is great enough to overcome the downward elastic force of the second compression spring 132, the surplus high-pressure air would, flow out of the tire to sequentially pass through the central opening 112 of the partition 110 and the first chamber 120 to push the first valve body 200 and the second valve body 300 upward and finally release the airtight contact of the second valve body 300 with the beveled stop shoulder 140, allowing the surplus high-pressure air to directly release from the hollow sleeve 100 via the release port 138 and thereby maintaining the tire pressure at an adequate level and preventing extra high-pressure air in the tire from causing risks in driving.

When the high-pressure air is gradually released from the inflation valve 1, the internal pressure of the tire gradually decreases to finally reach the pressure setting set via the inflation valve 1, and the second compression spring 132 elastically pushes the second valve body 300 downward until the second valve body 300 reaches the bottom of the second chamber 130, causing the second airtight gasket 332 to press against the beveled stop shoulder 140 to produce an air sealing thereat, as shown in FIG. 2. At this point, the release of the surplus high-pressure air stops, and the tire is maintained at the predetermined internal pressure setting.

Figure 5:
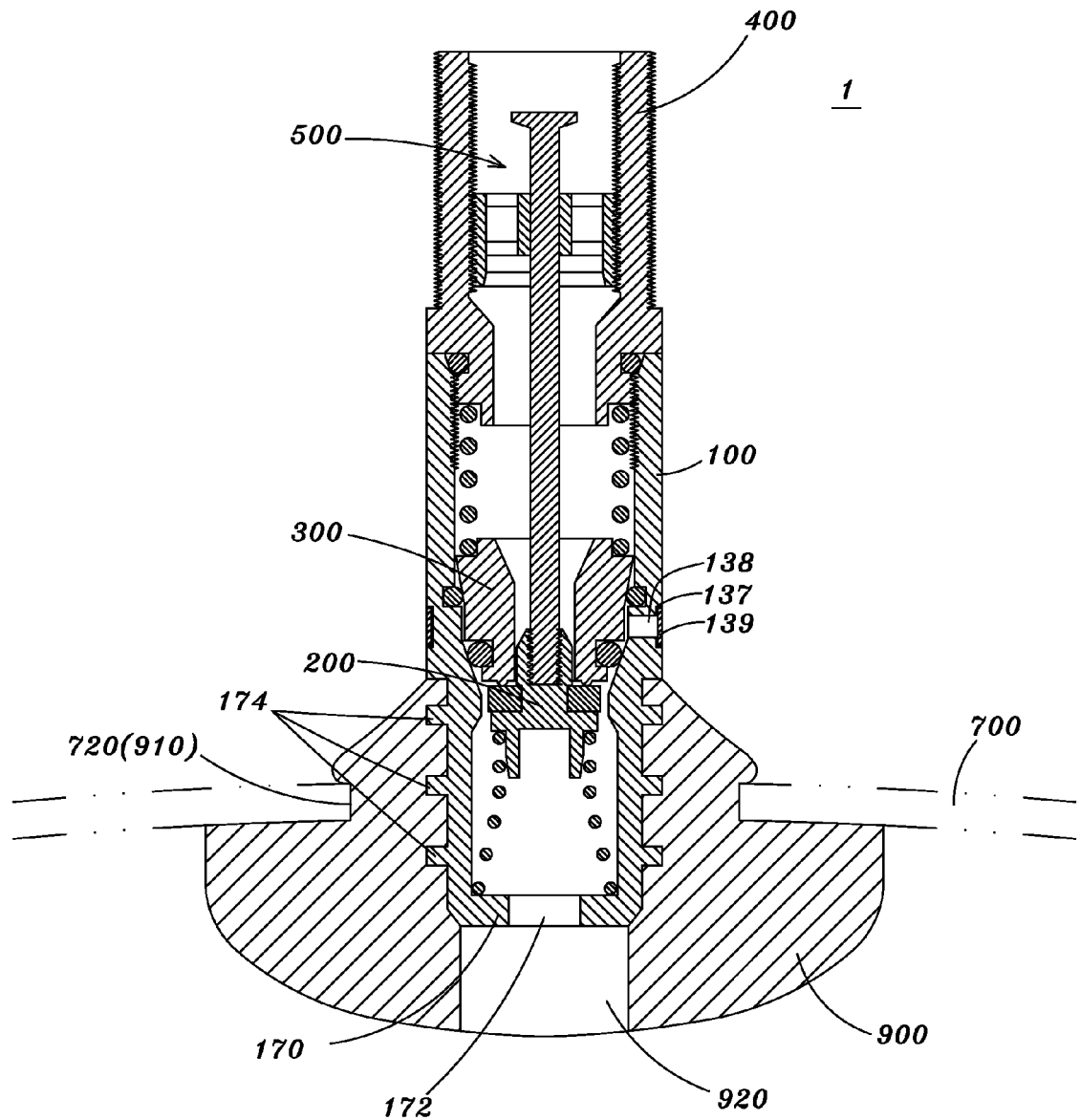
FIG. 5 is a vertical sectional view of an inflation valve according to a second preferred embodiment of the present invention mounted on a wheel rim.

Now referring to FIG. 5, the inflation valve 1 according to the second preferred embodiment of the present invention is mounted to a wheel rim 700 via an opening 720. In the second embodiment, the hollow sleeve 100 has a closed lower end 170 provided with a central opening 172, and is provided around a lower outer wall surface with a plurality of spaced, locating ribs 174. A locating member 900 made of a rubber material is put around the locating ribs 174 on the lower outer wall surface of the hollow sleeve 100. The locating member 900 is provided on an outer surface at a predetermined position with a fifth annular groove 910, such that the locating member 900 has a configuration generally looked like a bottle-gourd. The locating member 900 is also provided with an air vent 920 corresponding to the central opening 172 at the bottom of the hollow sleeve 100. With the above-described structure, the inflation valve 1 in the second preferred embodiment of the present invention may be assembled to the wheel rim 700 by extending an upper end of the hollow sleeve 100 from an inner side to an outer side of the wheel rim 700 via the opening 720, and firmly engaging the fifth annular groove 910 of the locating member 900 with the opening 720.

Figure 6:
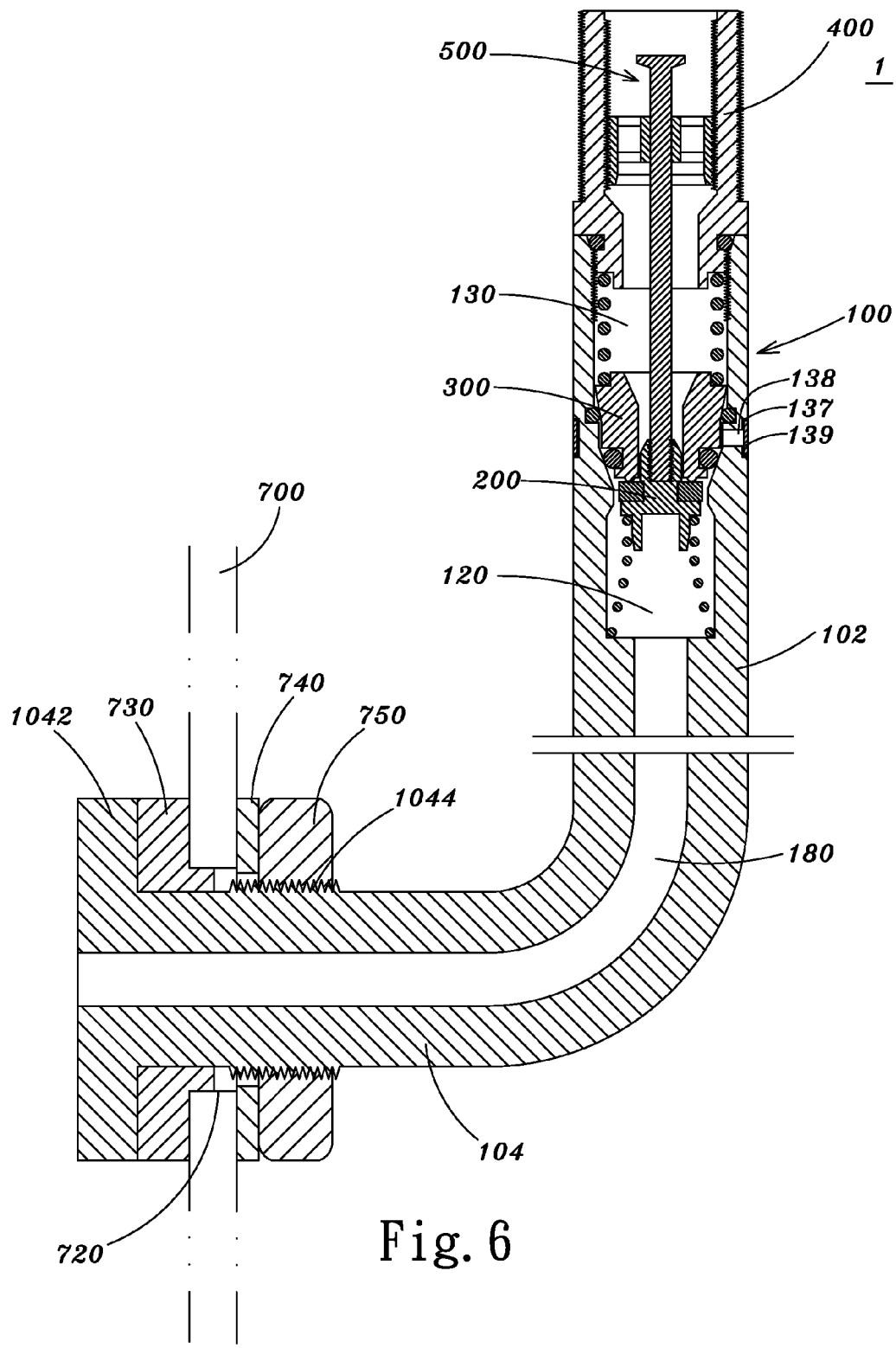
FIG. 6 is vertical sectional view of an inflation valve according to a third preferred embodiment of the present invention mounted on a wheel rim.

Referring to FIG. 6, the third preferred embodiment of the present invention is mounted to a wheel rim 700 via an opening 720. Unlike the long and straight hollow sleeve 100 in the first embodiment, the hollow sleeve 100 in the third embodiment is a generally L-shaped tubular member to include a vertical section 102 and a horizontal section 104. An inner space of the hollow sleeve 100 near a bottom of the vertical section 102 defines a first chamber 120 and a second chamber 130 above the first chamber 120. As in the first embodiment, a first valve body 200 and a second valve body 300 are located in the first and the second chamber 120, 130, respectively, an air inlet connector 400 is connected to an upper end of the hollow sleeve 100, and a central pin assembly 500 is mounted in the air inlet connector 400 with a lower end screwed to the first valve body 200. However, an air passage 180 is extended from a bottom of the first chamber 120 along an axis of the hollow sleeve 100 to a terminal end of the horizontal section 104 of the hollow sleeve 100 to replace the central opening 112 in the first embodiment. The hollow sleeve 100 in the third embodiment is provided, on an outer wall surface around the terminal end of the horizontal section 104, with a radially outward flange 1042, and before the flange 1042 with a fifth externally threaded section 1044. The inflation valve 1 in the third preferred embodiment is assembled to the wheel rim 700 by putting a sealing element 730 around the terminal end of the horizontal section 104 immediately before the flange 1042, and extending a front end of the vertical section 102 from an inner side to an outer side of the wheel rim 700 via the opening 720, such that the sealing element 730 is tightly pressed against the opening 720 to seal the same. Thereafter, sequentially put a washer 740 and a fastening member 750 on the hollow sleeve 100 via the front end of the vertical section 102, an screw the fastening member 750 to the fifth externally threaded section 1044 to firmly hold the horizontal section 104 at the opening 720.

Figure 7:
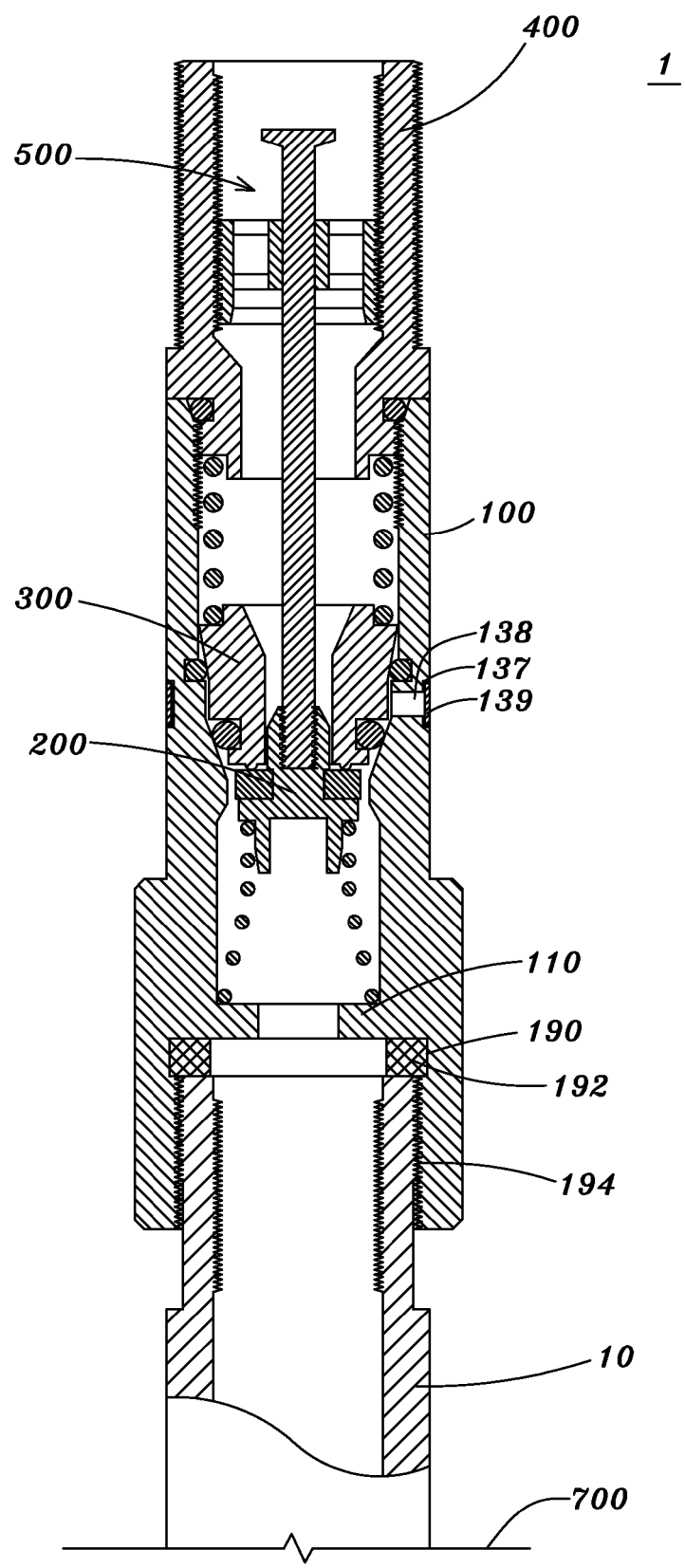
FIG. 7 is a vertical sectional view of an inflation valve according to a fourth preferred embodiment of the present invention mounted to an existing inflation valve on a wheel rim.

Further referring to FIG. 7, the inflation valve 1 according to the fourth preferred embodiment of the present invention is mounted on a conventional inflation valve 10 already provided on a wheel rim. The inflation valve 1 in the fourth preferred embodiment includes a hollow sleeve 100, an air inlet connector 400, a first valve body 200, a second valve body 300, and a central pin assembly 500.

In the fourth embodiment, the hollow sleeve 100 is a hollow tubular member without any annular seat 150 provided on an outer wall surface thereof, as shown in the first embodiment, but is provided around an inner wall surface below the partition 110 with a sixth annular groove 190 for receiving a sixth airtight gasket 192 therein, and below the sixth annular groove 190 with a third internally threaded section 194. With the above arrangements, the inflation valve 1 in the fourth embodiment may be directly screwed at a lower end to an upper part of the conventional inflation valve 10 on a wheel rim 700. It is noted a pin valve body 12 provided in the conventional inflation valve 10 has been removed in advance. For any tire already has a conventional inflation valve 10 provided on the wheel rim 700 thereof, the inflation valve 1 in the fourth embodiment of the present invention may be used in pumping the tire to achieve the same object of maintaining the tire at a proper internal pressure level.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An inflation valve to be mounted on an object for pumping an amount of air into said object via said inflation valve, comprising:

a hollow sleeve in the form of a hollow tubular member being provided at a bottom with a central opening, an inner space of said hollow sleeve above said central opening being divided into a first chamber and a second chamber located above and communicable with said first chamber, and on an inner wall surface at a joint of said first and said second chamber with a beveled stop shoulder;

a first valve body being located in said first chamber and in the form of a long stem having a conical head; said first valve body being provided at a lower end with a radially outward flange, below which a first compression spring is provided to elastically axially displace said first valve body in said first chamber;

a second valve body being located in said second chamber and defining a through hole extended along an axis thereof, such that said head of said first valve body is fitly received in said through hole; a second compression spring being provided above said second valve body to apply an elastic force against said second valve body, so that said second valve body is able to elastically axially displace in said second chamber; said second valve body being formed around an outer wall surface closely below an upper end thereof with a downward and inward inclined section corresponding to a first annular groove formed on an inner wall surface of said second chamber; a first airtight gasket being mounted in said first annular groove, such that when said second valve body is moved downward by the elastic force of said second compression spring, said inclined section may be pressed against said first airtight gasket; at least one release port being formed on a wall of the second chamber between said inclined section and said beveled stop shoulder to communicate the inner space of said hollow sleeve with an external space; said second valve body being further formed around the outer wall surface closely above a lower end thereof with a second annular groove for receiving a second airtight gasket therein, such that said second airtight gasket is located corresponding to said beveled stop shoulder;

an air inlet connector being axially mounted to an upper end of said second chamber of said hollow sleeve, and defining along an axis thereof an air inlet having a second internally threaded section provided around an inner peripheral wall thereof; and said air inlet connector being provided around an outer wall surface with a first externally threaded section; and a central pin assembly being mounted in said air inlet with a lower end fixedly connected to said head of said first valve body, so as to push said first valve body downward.

2. The inflation valve as claimed in claim 1, wherein said second chamber has an inner diameter larger than that of said first chamber.

3. The inflation valve as claimed in claim 1, wherein said first valve body is further formed below said flange with a downward projected ring, and an airtight washer being mounted around said first valve body above said flange.

4. The inflation valve as claimed in claim 1, wherein said air inlet connector is provided around a lower outer wall surface with a second externally threaded section, against a bottom surface upon which an upper end of said second compression spring is pressed; and wherein said second chamber is provided on the inner wall surface with a first internally threaded section corresponding to said second externally threaded section of said air inlet connector, so that said air inlet connector may be screwed to the upper end of said second chamber.

5. The inflation valve as claimed in claim 4, wherein said air inlet connector is formed above said second externally threaded section with a third annular groove for receiving a third airtight gasket therein.

6. The inflation valve as claimed in claim 1, wherein an upper opening of said second valve body above said through hole is flared to form an expanded opening, which allows air to easily flow into said second valve body through said through hole to a space below said second valve body.

7. The inflation valve as claimed in claim 1, wherein said central pin assembly includes a pin holder and a central pin with a lower end corresponding to the lower end of the central pin assembly; said pin holder being provided around an outer wall surface with a third externally threaded section, so that said pin holder may be mounted in said air inlet via meshing of said third externally threaded section with said second internally threaded section in said air inlet; said pin holder being formed on an upper surface with a centered through hole, around which a plurality of air vents are provided; and said central pin being in the form of an elongated stem and sequentially downward extended through said centered through hole of the pin holder and said through hole of said second valve body for the lower end to fixedly connect to said head of said first valve body.

8. The inflation valve as claimed in claim 7, wherein said central pin has a diametrically expanded head portion, and the lower end of the central pin is externally threaded for screwing to an internally threaded central hole formed on said head of said first valve body.

9. The inflation valve as claimed in claim 1, further comprising a cap removably covering said air inlet connector.

10. The inflation valve as claimed in claim 9, wherein said cap is provided on a top surface with a pressure value mark to indicate an applicable pressure range of said inflation valve.

11. The inflation valve as claimed in claim 1, wherein said hollow sleeve is internally provided near a bottom thereof with a partition, and said central opening is formed at a center of said partition.

12. The inflation valve as claimed in claim 11, wherein said hollow sleeve is provided on an outer wall surface at a predetermined position with an annular seat, and around a lower outer wall surface with a fourth externally threaded section.

13. The inflation valve as claimed in claim 12, wherein said annular seat is provided at an underside with a fourth annular groove.

14. The inflation valve as claimed in claim 1, wherein said hollow sleeve is provided around a lower outer wall surface with a plurality of spaced locating ribs: and said inflation valve further comprising a locating member put around said locating ribs, said locating member being provided on an outer surface at a predetermined position with a fifth annular groove, and at a bottom corresponding to said central opening at the bottom of said hollow sleeve with an air vent.

15. The inflation valve as claimed in claim 1, wherein said hollow sleeve is an L-shaped tubular member to include a vertical section and a horizontal section; said first chamber and said second chamber being formed in said vertical section, and all of said first valve body, said second valve body, said air inlet connector, and said central pin assembly being located in said vertical section; an air passage being extended from a bottom of said first chamber along an axis of said hollow sleeve to a terminal end of said horizontal section to form said central opening; and said horizontal section of said hollow sleeve being provided on an outer wall surface around the terminal end with a radially outward flange and a fifth externally threaded section.

16. The inflation valve as claimed in claim 11, wherein said hollow sleeve is provided around an inner wall surface below said partition with a sixth annular groove for receiving a sixth airtight gasket therein, and below said sixth annular groove with a third internally threaded section.

17. The inflation valve as claimed in claim 1, wherein said hollow sleeve is provided around an outer wall surface with an annular recess corresponding to an outer opening of said release port on said hollow sleeve; and a thin elastic dust ring being mounted in said annular recess.

* * * * *